(12) United States Patent
Carney

(10) Patent No.: US 8,803,673 B2
(45) Date of Patent: Aug. 12, 2014

(54) SYSTEM AND METHOD FOR EVALUATING SURFACE FINISH OF TIRE RETREAD

(75) Inventor: Bruce E. Carney, Anderson, SC (US)

(73) Assignees: Michelin Recherche et Technique S.A., Granges-Paccot (CH); Compagnie Generale des Establissements Michelin, Clermont-Ferrand (FR)

( * ) Notice: Subject to any disclaimer, the term of this patent is extended or adjusted under 35 U.S.C. 154(b) by 235 days.

(21) Appl. No.: 13/377,637

(22) PCT Filed: Jun. 29, 2009

(86) PCT No.: PCT/US2009/049056
§ 371 (c)(1),
(2), (4) Date: Dec. 12, 2011

(87) PCT Pub. No.: WO2011/002439
PCT Pub. Date: Jan. 6, 2011

(65) Prior Publication Data
US 2012/0086566 A1  Apr. 12, 2012

(51) Int. Cl.
*B60C 25/00* (2006.01)
*G01M 17/02* (2006.01)
*B60C 11/24* (2006.01)

(52) U.S. Cl.
CPC ............ *G01M 17/024* (2013.01); *B60C 11/246* (2013.01); *B60C 25/00* (2013.01); *B60C 25/002* (2013.01); *B60C 25/007* (2013.01); *B60C 2011/0374* (2013.01); *B60C 2011/0358* (2013.01)
USPC ................ 340/426.33; 356/239.3; 356/239.7; 73/146; 702/35; 152/154.2; 152/209.1; 152/212

(58) Field of Classification Search
CPC .............. G01M 17/024; B60C 11/246; B60C 2011/0374; B60C 2011/0358; B60C 25/00; B60C 25/002; B60C 25/007

USPC ............... 73/146; 340/443; 356/239.3, 239.7; 702/35

See application file for complete search history.

(56) References Cited

U.S. PATENT DOCUMENTS

| | | | |
|---|---|---|---|
| 5,845,232 A | 12/1998 | Shively et al. | |
| 5,895,845 A * | 4/1999 | Burger | 73/146 |
| 6,789,416 B1 | 9/2004 | Tracy et al. | |
| 7,012,701 B2 * | 3/2006 | Hassler et al. | 356/601 |
| 7,337,816 B2 * | 3/2008 | Canankamp et al. | 152/209.24 |
| 7,369,956 B2 * | 5/2008 | Reynolds et al. | 702/113 |

OTHER PUBLICATIONS

Supplementary European Search Report for EP 09 84 6930, dated Nov. 14 2012.

* cited by examiner

*Primary Examiner* — Daniel Wu
*Assistant Examiner* — Benyam Haile
(74) *Attorney, Agent, or Firm* — Dority & Manning

(57) ABSTRACT

A measurement system scans the given surface of a tire component (e.g., a brush-finished tread or buffed tire casing) to electronically measure data points corresponding to vertical and horizontal coordinates along the given surface. Associated computer processors electronically calculate the slope at a plurality of different locations by determining the degree of steepness (e.g., rise over run, angle or grade) between selected ones of the first and second coordinates and electronically comparing at least one slope-based parameter to one or more predetermined levels to determine a characterization defining one or more of surface adhesion fitness, finishing brush wear level and brush bristle placement location. Slope may be determined between every adjacent pair of data points or between selected data points (e.g., identified local maximum and minimum). The at least one-slope based parameter compared to the predetermined levels may correspond to the slopes themselves or to a calculated average slope value.

19 Claims, 6 Drawing Sheets

SYSTEM AND METHOD FOR EVALUATING SURFACE FINISH OF TIRE RETREAD

FIELD OF THE INVENTION

The invention generally relates to systems and methods for measuring and evaluating the surface finish of tire components, and more particularly relates to measuring and evaluating the base surface of pre-mold tire retreads prepared by brushing or other methods and/or buffed tread casings.

BACKGROUND OF THE INVENTION

Tire retreading (or recapping) operations are generally used to extend the useful service life of a tire by removing previously worn tread from a tire and bonding new tread in its place. Tires may be retreaded one or more times as a less expensive alternative to purchasing new tires, providing particular advantages for large-scale operations such as trucking, bussing and commercial aviation.

In general, a retreading process may involve one or more of the following steps: (1) inspecting a worn tire for safety purposes to ensure fit for the retread process, (2) stripping or buffing the worn tread from the crown of a tire carcass; (3) preparing a new tread; (4) bonding the tread to the buffed tire carcass; and (5) curing the retreaded tire.

Precise buffing of the worn tire casing and/or the base surface of the tread is critical to retread performance, as proper buff texture strengthens the tread to casing bond. Correct preparation of the tire casing and tread base surfaces promotes long, even tread wear.

Known conventional methods for preparing the tire casing involve removal of the old tread from the casing with a rotary "rasp" blade. Pre-molded tread base is typically prepared by brushing the length of such surfaces with an approved brush rotating the length direction of the tread or tire casing. Quality control of such methods may involve mere visual comparison of the prepared surfaces to predetermined standards, for example, the casing buffing standards developed by the Rubber Manufacturers Association (RMA). Visual analysis of surface texture is a subjective method that often lacks quantitative features. As such, a more precise system and method for analyzing surface texture as particularly related to the adhesion strength in tire retread bonding applications is desired.

Although known technology for surface and measurement inspection has been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved apparatus and methodology has been provided to measure and analyze the surface of a tire component, such as a brush-finished tread surface or a buffed tire casing. More particularly, the texture of a prepared tire or tread surface is evaluated by measuring the profile, determining slope, and analyzing the determined values to produce a meaningful output indicative of the surface texture. In one example, surface texture outputs indicate levels of adhesion fitness. In another example, surface texture outputs represent brush or blade replacement or sharpening indications or preferred brush bristle or blade locations.

One exemplary embodiment of the present subject matter involves a method for measuring and evaluating surface variations of a tire component, such as but not limited to one or more of the opposing tire surfaces involved in retread operations, namely, the prepared inner surface of a tread or outer surface of a tire casing. A first exemplary step in such method involves measuring a plurality of data points relative to a given surface of the tire component. In one example, measured data points respectively comprise at least first and second coordinates, which may be representative of vertical and horizontal (i.e., x and y) position along the given surface. The slope may then be electronically calculated at a plurality of different locations along the measured surface, by determining the degree of steepness between selected ones of the first and second coordinates. Slope may be defined in terms of one of the following parameters: rise over run, angle and grade. At least one slope-based parameter (a parameter consisting of or determined from the calculated slope values) is compared to one or more predetermined levels to determine a characterization defining one or more of surface adhesion fitness, finishing brush or rasping blade wear level and brush bristle or blade placement location.

In the foregoing exemplary embodiment, the plurality of different locations at which slope may be electronically calculated can vary. In one example, slope is calculated between each adjacent pair of data points. In another example, slope is calculated at some subset of data points. In a still further example, slope is calculated between identified local maximum and minimum data points. The measured data points may sometimes be adjusted upwards or downwards before the slope is calculated (for example, to account for potential sampling limitations in the measurement process). The slope-based parameter used for subsequent comparison may more particularly correspond to all or a subset of such calculated slope values, or to an average of the slope values. In one particular example, an average value corresponds to an average of the set of all calculated slope values minus one or more highest slope values and one or more lowest slope values.

The predetermined levels used for comparison purposes to the slope-based parameter(s) may be particularly defined depending on the output desired by a user. For example, if a user is characterizing the adhesion fitness of a surface, the predetermined levels may be designed to determine whether an average slope value falls within an angular range selected from between about twenty degrees (20°) to about fifty-five degrees (55°). Once desirable levels or ranges of slope have been identified, outputs can signal whether or not a calculated slope falls within this range. Alternative outputs can determine when finishing brushes or rasping blades have become too worn to provide such desirable slope levels, and provide alarm signal outputs indicating such conditions. Still further, brush bristle locations can be monitored and controlled to provide the desired slope levels.

In addition to various methodologies, it is to be understood that the present subject matter equally relates to associated systems, including various hardware and/or software components that may be provided in a measurement system. In one exemplary embodiment, the present subject matter concerns a system for measuring and analyzing surface variations of a tire component. Such a measurement system may generally include two different types of hardware components, namely measurement components and post-measurement processing components.

The measurement components of a particular tire measurement system may include a profilometer, or measuring instrument capable of measuring a surface's profile. In one example, the profilometer comprises a laser for scanning the given surface of a tire component with one or more beams of illumination and a detector for optically capturing a reflection of the one or more illumination beams and a positioning drive with encoder for traversing a sample. From the detector and/or encoder, data points comprising at least first and second coordinates may be provided. Such first and second coordinates may, for example, correspond to vertical and horizontal position of the given measured surface.

In one exemplary embodiment, processing components of the measurement system include a first memory/media element adapted for storing data points measured by the profilometer, a second memory/media element adapted for storing software in the form of computer-executable instructions, and at least one processor coupled to the first and second memories and configured to selectively implement the computer-executable instructions stored in the second memory to evaluate the measured data points stored in the first memory.

In a particular embodiment of the above measurement system, the one or more processors implement the computer-executable instructions stored in memory in order to process raw run-out measurements stored in memory by implementing the functions of: calculating the slope at a plurality of different locations along the given surface of the tire component by determining the degree of steepness between selected ones of the first and second coordinates measured along the given surface of the tire component; and comparing at least one slope-based parameter to one or more predetermined levels to determine a characterization defining one or more of surface adhesion fitness, finishing brush wear level and brush bristle placement location.

Additional memory/media element(s) may also be provided for storing output data to provide to a user or for subsequent processing or feedback control. Output devices may be configured to signal an alarm when a slope-based parameter is above or below one or more predetermined levels. Output devices may also be configured to provide visual depictions of determined characterizations or calculated parameters (e.g., slope values or slope-based parameters).

Additional embodiments of the present subject matter, not necessarily expressed in the summarized section, may include and incorporate various combinations of aspects of features, components, or steps referenced in the summarized embodiments above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
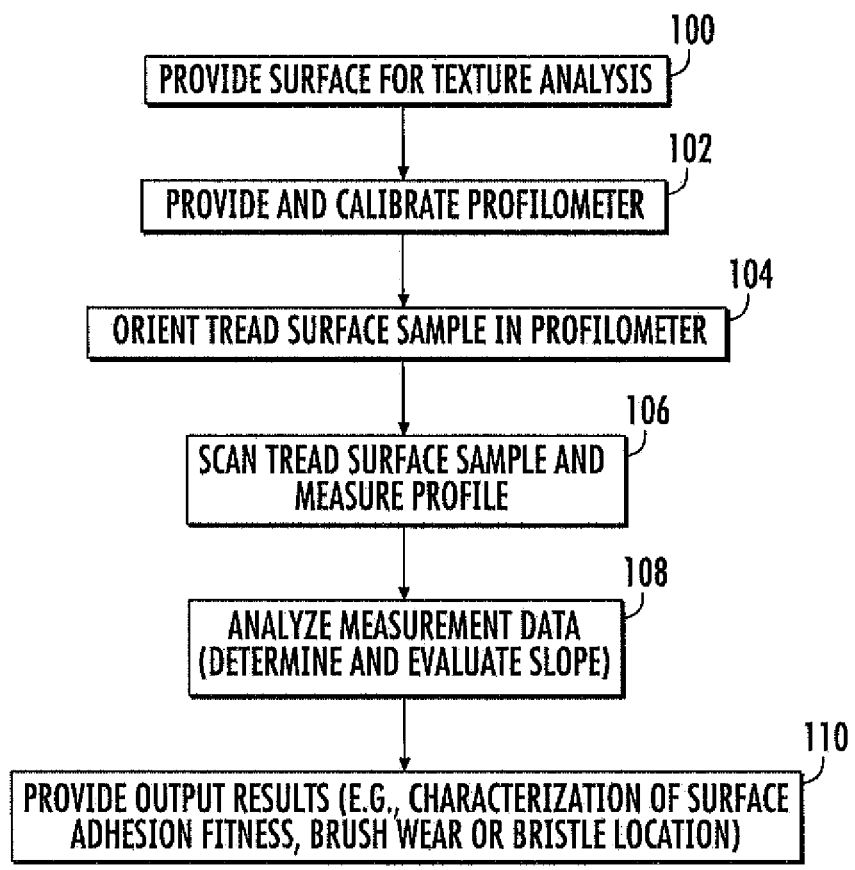
FIG. 1 is a flow chart of exemplary steps and features in a method for measuring and analyzing the profile of a tire component surface in accordance with the presently disclosed technology.

Repeat use of reference characters throughout the present specification and appended drawings is intended to represent same or analogous features, elements or steps of the present invention.

DETAILED DESCRIPTION OF THE PREFERRED EMBODIMENTS

As discussed in the Summary of the Invention section, the present subject matter is particularly concerned with a system and method for measuring and analyzing the profile of a brushed tire component surface. More particularly, the texture of a brushed tire or tread surface is evaluated by measuring the profile, determining slope, and analyzing the determined values to produce a meaningful output indicative of the surface texture. In one example, surface texture outputs indicate levels of adhesion fitness. In another example, surface texture outputs represent finishing brush replacement indications or preferred brush bristle locations.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Referring now to FIG. 1, a first step 100 in an exemplary method involves providing a surface for texture analysis. Although the subject features and steps may be applied to a variety of different surfaces, the exemplary embodiments discussed herein are directed to texture analysis of rubber tire component surfaces. In particular examples, the analyzed surfaces may correspond to either an outer tire casing surface or an inner tread surface, one or both surfaces of which are generally buffed or brush finished before being affixed together during a tire retread operation. When a tread surface is provided for analysis in step 100, the tread surface may correspond to the entire width of a cured tread portion or merely a sample of such cured tread.

When samples are provided, it may be useful to ensure that the selected samples are representative of the entire tread portion. Some samples that have been found to be more representative for evaluation purposes than others are those towards the inner portion of a tread (as opposed to the ends) as well as those that are free from abrasion or contamination (dust, cement, etc.) Samples for testing may be selected in a random or deterministic fashion, and may be cut to various sizes depending on the preferred thoroughness of surface testing and/or potential limitations of the measuring instruments.

Figure 3A:
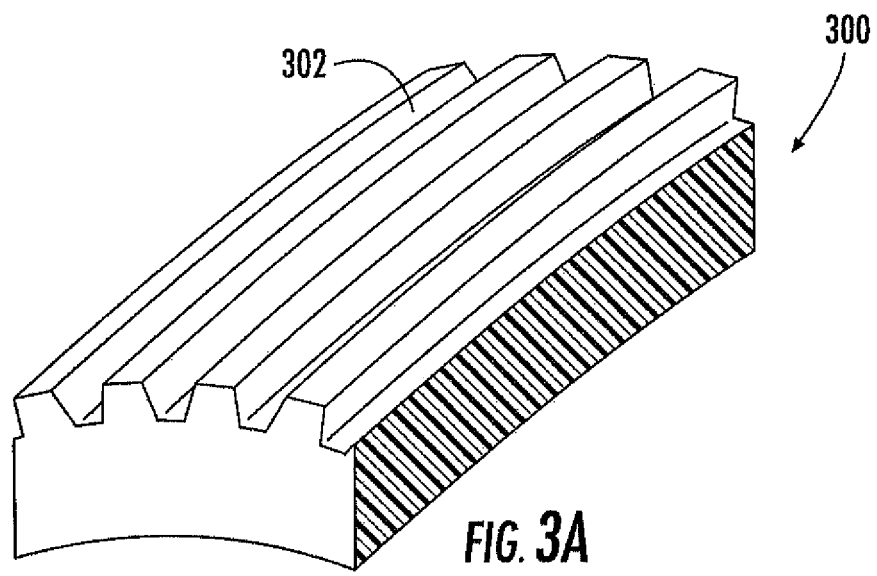
FIG. 3A is a perspective view of an exemplary tread portion for use in tire retreading, showing the outer tread surface of the tread portion.
Figure 3B:
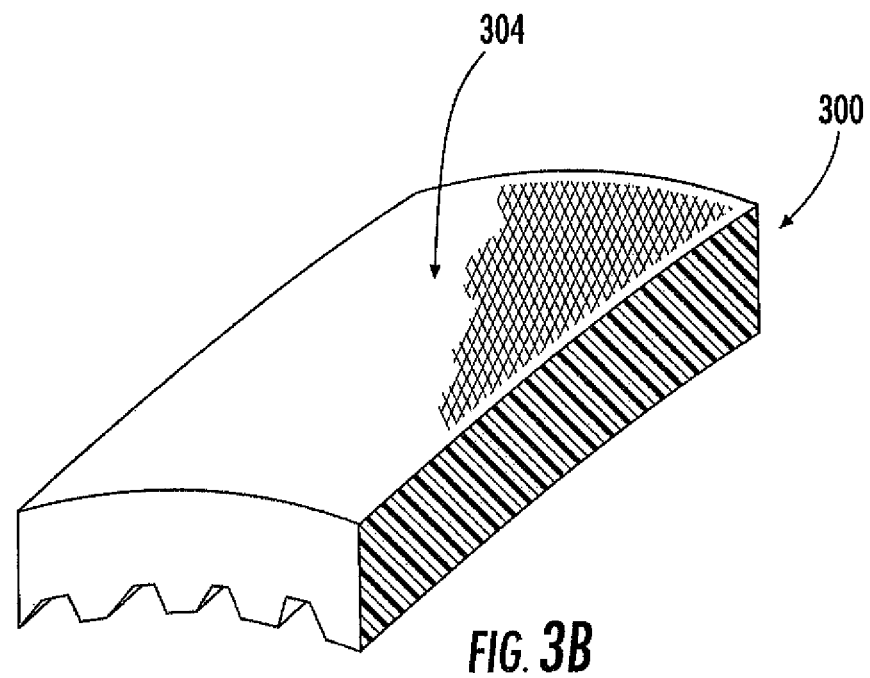
FIG. 3B is a perspective view of an exemplary tread portion for use in tire retreading, showing the inner tread surface of the tread portion, for affixing to a tire casing.

An example of a tread portion that may be analyzed in accordance with the subject technology is illustrated in the top and bottom perspective views of FIGS. 3A and 3B. As shown in FIG. 3A tread portion 300 generally includes an outer (or top) tread surface 302, which is the surface adapted for contact with a road or other ground location. As shown in FIG. 3B, tread portion 300 also includes an inner (or bottom) tread surface 304, which is generally parallel to the outer tread surface 302 and on the opposite side of the tread portion 300 from such outer surface 302. Inner tread surface 304 generally exhibits a certain amount of roughness after the surface is buffed or brush finished. In one example, grooves are created in a tread surface by forcibly applying industrial-grade metal brushes in one or more given directions along the inner tread surface 304.

The types of grooves formed, or torn, into inner tread surface 304 may generally be characterized according to four basic levels. A first level of surface variations, referred to herein as "macro", are those that can be viewed and discerned by the naked eye. A second level of surface variation, referred to herein as "sub macro", is composed of the grooves themselves, including pitch and depth as may be seen with the aid of between about 6× and 10× magnification. A third level of surface variation, referred to herein as "pre micro", is composed of the variations in the slope of each groove as may be seen with the aid of between about 25× and 50× magnification. A fourth level of surface variation, referred to herein as "micro", is composed of the small craters and mounds created by the tearing of the rubber during brush finishing as may be seen with microscopic magnification on the order of about 100× or more. Surface evaluation techniques in accordance with the present subject matter are capable of analyzing many more of these different surface variation levels than prior visual inspection methods which often analyzed only macro level variations. Advantages are thus achieved by analyzing more detail in surface level variation as well as by performing such evaluation techniques in a quantitative as opposed to a subjective fashion.

A second step 102 in the process of FIG. 1 involves providing and calibrating a profilometer, which generally corresponds to a measuring instrument that is able to measure a surface's profile. Exemplary profilometers for use in accordance with the present subject matter include laser-based profile sensors that are adapted to determine the profile on one or more surfaces of a provided element. In one embodiment, a profilometer is used for obtaining surface location measurements in terms of first and second directions (e.g., x and y Cartesian coordinates or other two-dimensional geometric parameters). The profile measuring instrument may be provided as a separate device or in line with a brush finishing system such that a surface to be analyzed is both textured and evaluated within a single integrated system. More particular details of an exemplary laser-based profilometer are illustrated in and discussed with reference to FIG. 6.

Referring still to exemplary step 102, some profilometers may employ an initial calibration procedure to help ensure the accuracy of obtained measurements. For example, calibration procedures with laser-based measuring instruments may be performed to account for any vertical or horizontal offset in the mounting of the laser(s), potential errors in the edge detection of measured surfaces (due to the fact that a laser measurement beam is not infinitely small), any potential variations due to the temperature of the lasers, and the like.

Once the measuring instrument (e.g., a profilometer) and the given surface to be analyzed are identified and provided, the surface is oriented within the profilometer in a precise fashion per step 104. Proper orientation facilitates the subsequent measurement process of step 106. In one embodiment, for example, when a tread sample surface is provided for measurement, the surface is positioned along a base or mounting platform to optimize the capabilities of the measuring equipment. In a laser-based profilometer, such positioning may correspond to providing the measured surface at the optimal location corresponding to the focus point of the laser.

Referring now to step 106, the profile of the surface to be analyzed is measured with the profilometer. In one example, such measurement involves scanning the tread surface with laser sensors and obtaining corresponding profile measurements at specific locations (data points) defined along the tread surface. In one example, the profile measurements include first and second coordinates defining the vertical and horizontal location of the measured surface (e.g., x and y values) at multiple consecutive data points along the measured surface. Although the examples herein discuss data points that include first and second coordinates (thus forming 2-dimensional surface data), it should be appreciated that more than two coordinates can be used for providing surface data in three-dimensional (3D) form or others.

Related measurement parameters may be defined, including those that affect the frequency and quality of such profile measurements. For example, measurement parameters may include but are not limited to a scan speed (defined by a specific or relative value), scan type (single or multiple measurement passes), surface selection (top, bottom, both), sampling rate, data filtering options, and the like. In one example, the sampling rate is set to measure consecutive data points along a tread surface at fixed increments selected from a range of about 0.1 mm to 0.3 mm. In another example, consecutive data points are measured along a tread surface at fixed increments selected from a range of about 0.01 mm to 0.10 mm.

Once measurements are obtained in step 106, the measurement data is analyzed in step 108. In general, the data analysis includes two parts. First, the slope is determined, and then the slope is evaluated to provide a meaningful output for a user. As part of slope determination, step 108 takes first and second (x and y) coordinates for all or a selected set of the obtained measurements and determines the slope of the surface as defined between selected measured points. Additional details regarding data analysis step 108, including slope determination, are discussed in the steps of FIG. 2.

"Slope" as used herein generally means the upward or downward degree of slant, or steepness of a line. Slope can be defined in terms of a number of different parameters, including but not limited to: (1) the ratio of rise over run ($\Delta y/\Delta x$ between two points), (2) an angle defined between the measured line and a reference (such as horizontal) line, and (3) the grade, or percentage equal to (rise/run)*100. Slope is indicative of the geometric shape of the surface, and is a significant factor for characterizing the resultant tread surface texture from a brush finishing process. This is because the slope is indicative of the proportion increase in area created by finishing. Adhesion fitness (e.g., when a tread is adhered to a tire casing during retread) is a proportional function of area. As such, determination of slope can provide more useful information for evaluating adhesion fitness than the height and pitch of adjacent grooves.

Once slope is determined in data analysis step 108, such slopes may be evaluated to determine whether the slope is indicative of certain conditions. In one example, slope levels are compared to predetermined ranges to evaluate how the surface texture compares with desired levels of adhesion fitness. In another example, slope levels are compared to predetermined ranges to determine whether finishing brushes are getting dulled or worn down, thus providing a useful indication of whether finishing brushes need sharpening or replacement. Additional details regarding the slope evaluation portion of data analysis step 108 are also discussed in the steps of FIG. 2.

The data analysis of step 108 (and particular analysis steps set forth in FIG. 2) may occur within a computer or other processing unit associated with the profilometer or may be exported to a separate processor for further evaluation. As such, measurement data may be stored in a database or other memory device in a variety of different local or remote locations and may be analyzed by a local processor or remote processor having access to the data via some network, such as but not limited to a dial-in network, a local area network (LAN), wide area network (WAN), public switched telephone network (PSTN), the Internet, intranet or ethernet type networks and others over any combination of hard-wired or wireless communication links. It should be further appreciated that the data analysis of step 108 (including determination of slope) may be separate from measurement step 106 (where first and second profile coordinates are measured), or slope itself may be measured directly with a profilometer by integrating data analysis steps into the measurement steps.

Referring still to FIG. 1, a final step 110 involves providing output to a user. Output may be provided in a variety of fashions, including but not limited to displays on monitors, printed materials, or visual or audible indicators. For example, displayed outputs may variously include graphical depictions, charts, tables, plots, or the like of the measured surface profile coordinates and/or slope values. Visual or audible displays, signals or alarms indicating whether surface texture and/or brush sharpness falls within acceptable or unacceptable limits may additionally or alternatively be provided.

Figure 2:
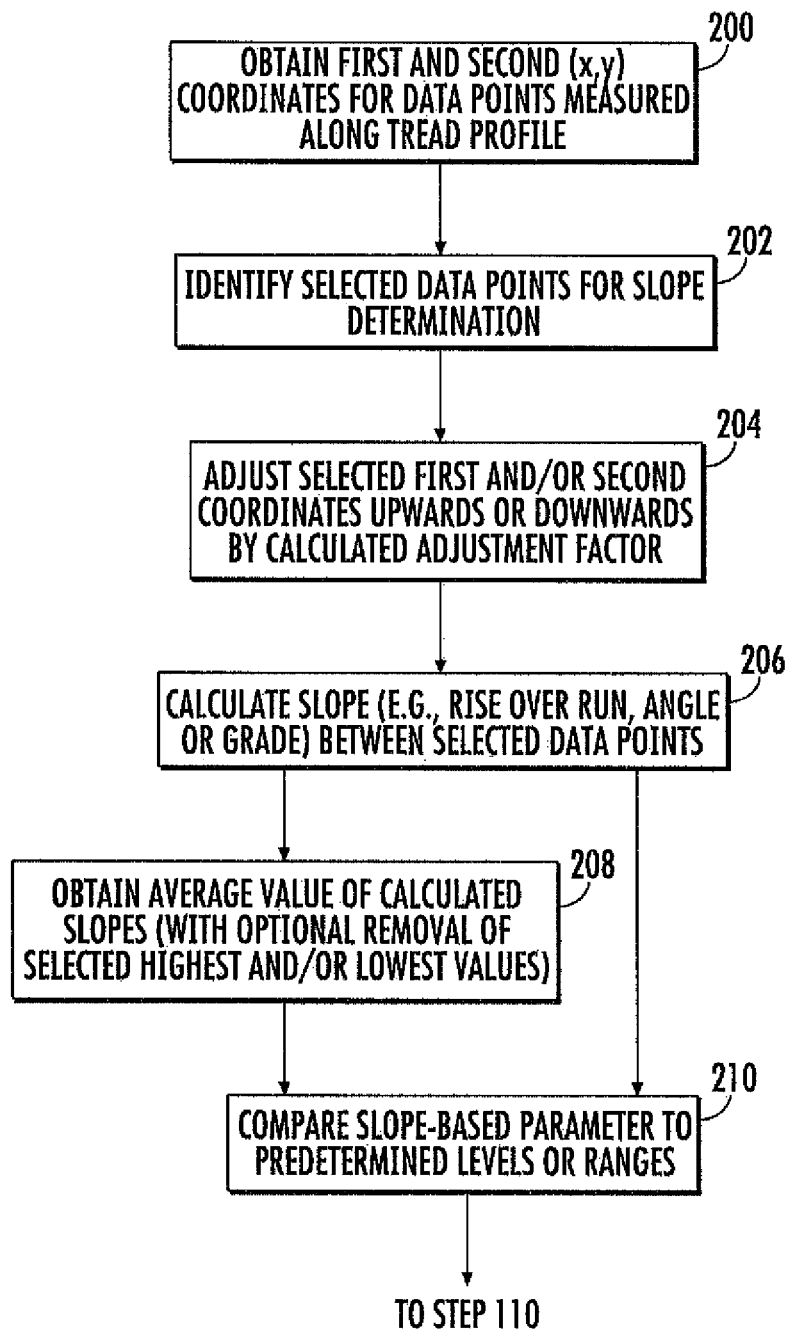
FIG. 2 is a flow chart of exemplary steps and features in a method for analyzing profile measurement data in accordance with aspects of the presently disclosed technology.
Figure 4:
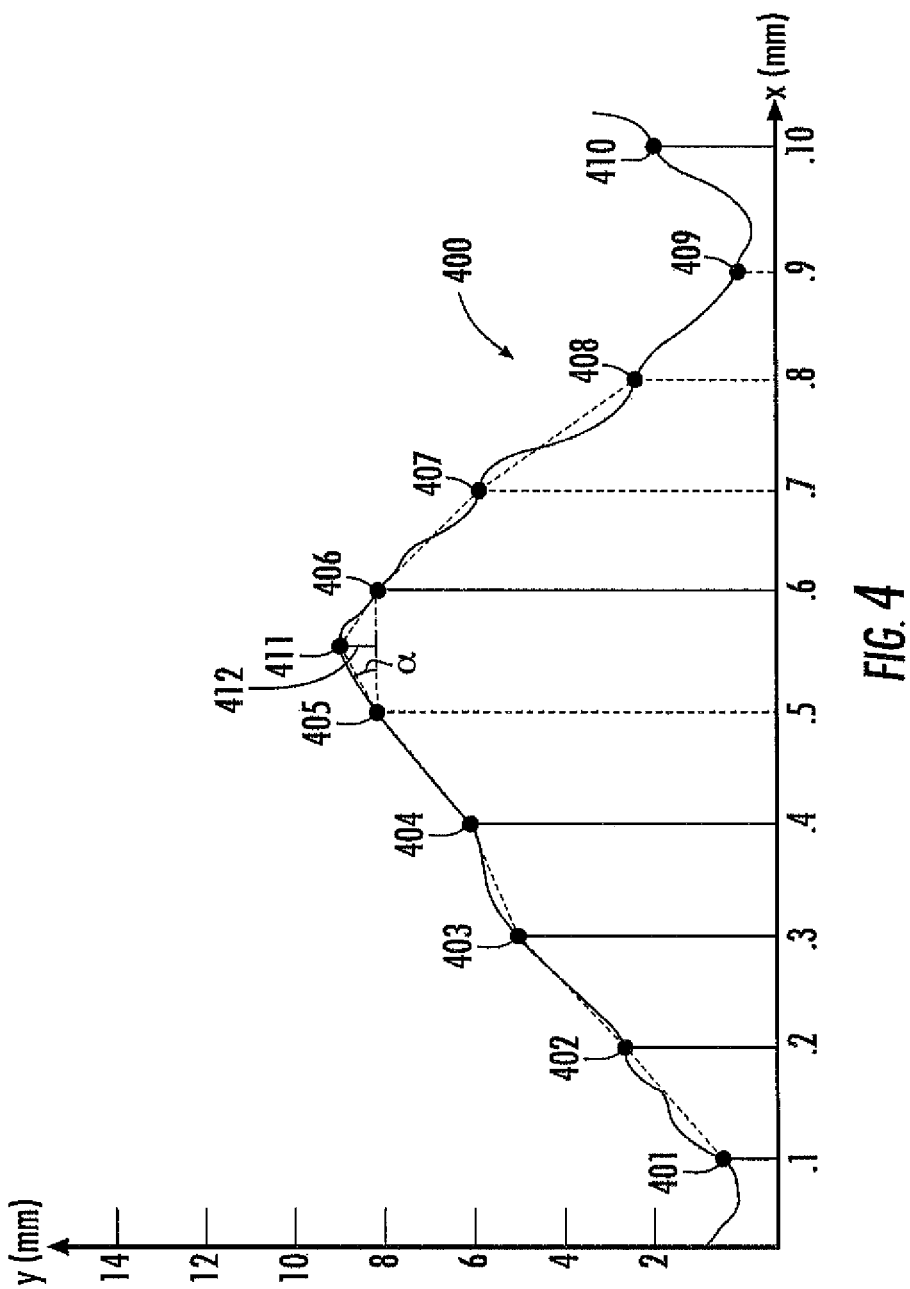
FIG. 4 is a graphical representation of exemplary obtained profile measurements, coordinate adjustment, and slope determination in accordance with aspects of the presently disclosed technology.

FIG. 2 provides a flow chart of steps that may be variously performed in a more particular example of data analysis step 108 from FIG. 1. A first step 200 involves obtaining the x and y coordinates for data points measured along a tread profile. FIG. 4 provides a graphical illustration of exemplary measurement data (data points 401-410) obtained for a tire profile generally represented by curve 400. Data points 401-410 represent a determined tread profile height measured in mm vertically along the ordinate versus horizontal position measured in mm along the abscissa. As shown, measurement increments are obtained by the profilometer in positional increments of about every 0.1 mm in the horizontal direction.

Step 202 in FIG. 2 involves identifying data points to be used for slope determination. As previously mentioned, slope can be determined from all measured data points or a selected subset thereof. For example, the increasing slope in the exemplary profile of FIG. 4 may be measured by determining the slope of a line formed between each consecutive pair of data points (e.g., the slope between data points 401 and 402, 402 and 403, 403 and 404, etc.). In another example, slope is determined by selecting identified local maximum and minimum data points, intended to represent the peaks and valleys between different surface grooves (e.g., the slope between data points 401 and 405 and then between 405 or 406 and point 409).

Step 204 involves calculating an adjustment factor for measured data points that may optionally be performed before the actual calculation of slope values. Such adjustment factor may be particularly useful for adjusting the vertical (y) coordinate of a measured profile when the measurement data does not capture the actual highest or lowest points along a profile because of sampling limitations in the measurement equipment. For example, in FIG. 4, measurement data points 405 and 406 correspond to the highest values of the measurement data, although the peak value within that portion of the surface profile actually occurs at point 411. Interpolation techniques may be used to determine an adjustment factor ($\Delta y+$), such as represented by distance 412, to add to the peak data point determined in the range of data points 401-410. Adjustment factors may be determined for identified local maximum and minimum data points, for every data point, or for a selected subset of data points depending upon user preference.

Once data points are identified and optionally adjusted, step 206 involves the actual slope calculation. As previously mentioned, slope can be calculated and expressed as a variety of different parameters, including but not limited to the rise/run, angle ($\theta$), grade, or the like. One particular method compares sequential data points to determine a $\Delta x$ and $\Delta y$ value, then determines the rise over run by dividing $\Delta y$ and $\Delta x$ ($\Delta y/\Delta x$=rise/run). The arc tangent of rise over run (a tan ($\Delta y/\Delta x$)) provides the slope angle in degrees or radians. The calculated slopes, the magnitude value of the calculated slopes, an average of such slope values, or other slope-based calculation (including surface area or other value) may then optionally be used for evaluation purposes. When slope averaging occurs for different areas of investigation, as indicated at step 208, any number of different averaging techniques may be applied. In one example, an average is calculated for a range of slope values after removing one or two or more highest and one or two or more lowest values from the subset of slope values.

Referring now to step 210, the individual slopes, a selected subset of slopes, the average slope values, and/or graphical depictions of such values are then evaluated, for example by comparison to predetermined levels or ranges of values. One exemplary set of ranges ranks tread profile slope as falling in one of a plurality of identified categories such as good, acceptable or unacceptable. As shown in the following table, an example of a good slope may correspond to one having an angle between about 40 and 60 degrees or having a rise over run between about 0.84 and 1.73. An example of an acceptable slope may be outside of this first range on higher and/or lower ends thereof, for example between about 35 and 40 degrees or between about 60 and 65 degrees (or such corresponding rise over run values). An example of an unacceptable category may correspond to slopes having angles less than about 35 degrees or greater than about 60 degrees, or having rise/run values less than about 0.700 or greater than about 2.145.

The rankings in the table below may indicate fitness levels for retread adhesion purposes. When slope levels fall below a certain predetermined level, the overall surface area of the evaluated surface is below a desirable level for achieving preferred adhesion levels. When slope is above a certain predetermined level, the surface grooves may be so unstable as to bend or deform during the adhesion process, also decreasing adhesion effectiveness. As such, preferred slope, and thus corresponding surface area and adhesion fitness characterizations may often fall into a middle range, such as but not limited to an angular range having a center value somewhere between about forty-five and fifty-five degrees (45-55°), e.g., 45° or 50°.

TABLE 1

EXEMPLARY SLOPE EVALUATION

| Angle (degrees) | Rise/Run ($\Delta y/\Delta x$) | Ranking Category: |
|---|---|---|
| 32 | 0.625 | Unacceptable |
| 33 | 0.649 | Unacceptable |
| 34 | 0.675 | Unacceptable |
| 35 | 0.700 | Acceptable |
| 36 | 0.727 | Acceptable |
| 37 | 0.754 | Acceptable |
| 38 | 0.781 | Acceptable |
| 39 | 0.810 | Acceptable |
| 40 | 0.839 | Acceptable |
| 41 | 0.869 | Good |
| 42 | 0.900 | Good |
| 43 | 0.933 | Good |
| 44 | 0.966 | Good |
| 45 | 1.000 | Good |
| 46 | 1.036 | Good |
| 47 | 1.072 | Good |
| 48 | 1.111 | Good |
| 49 | 1.150 | Good |
| 50 | 1.192 | Good |
| 51 | 1.235 | Good |
| 52 | 1.280 | Good |
| 53 | 1.327 | Good |
| 54 | 1.376 | Good |
| 55 | 1.428 | Good |
| 56 | 1.483 | Good |
| 57 | 1.540 | Good |
| 58 | 1.600 | Good |
| 59 | 1.664 | Good |
| 60 | 1.732 | Good |
| 61 | 1.804 | Acceptable |
| 62 | 1.881 | Acceptable |
| 63 | 1.963 | Acceptable |
| 64 | 2.050 | Acceptable |
| 65 | 2.145 | Acceptable |
| 66 | 2.246 | Unacceptable |
| 67 | 2.356 | Unacceptable |
| 68 | 2.475 | Unacceptable |

In another example (not captured in the above table), desirable slope levels for adhesion fitness may generally be identified as ones having a range selected from the broad range of about twenty degrees (20°) to about fifty-five degrees (55°). In another more particular example, slopes having a range from between about twenty-five degrees) (25°) and about thirty-five degrees (35°) are selected as desirable. Although higher slope values above these exemplary ranges may also provide desirable surface textures for proper adhesion, the lower range of values may be preferred in some embodiments because they can achieve desirable surface texture while simultaneously minimizing the amount of rubber that needs to be removed from a surface. Optimizing the removal amount and the surface texture for proper adhesion can help ensure product quality while also minimizing cost of the preparation (e.g., brush finishing) techniques.

Figure 5:
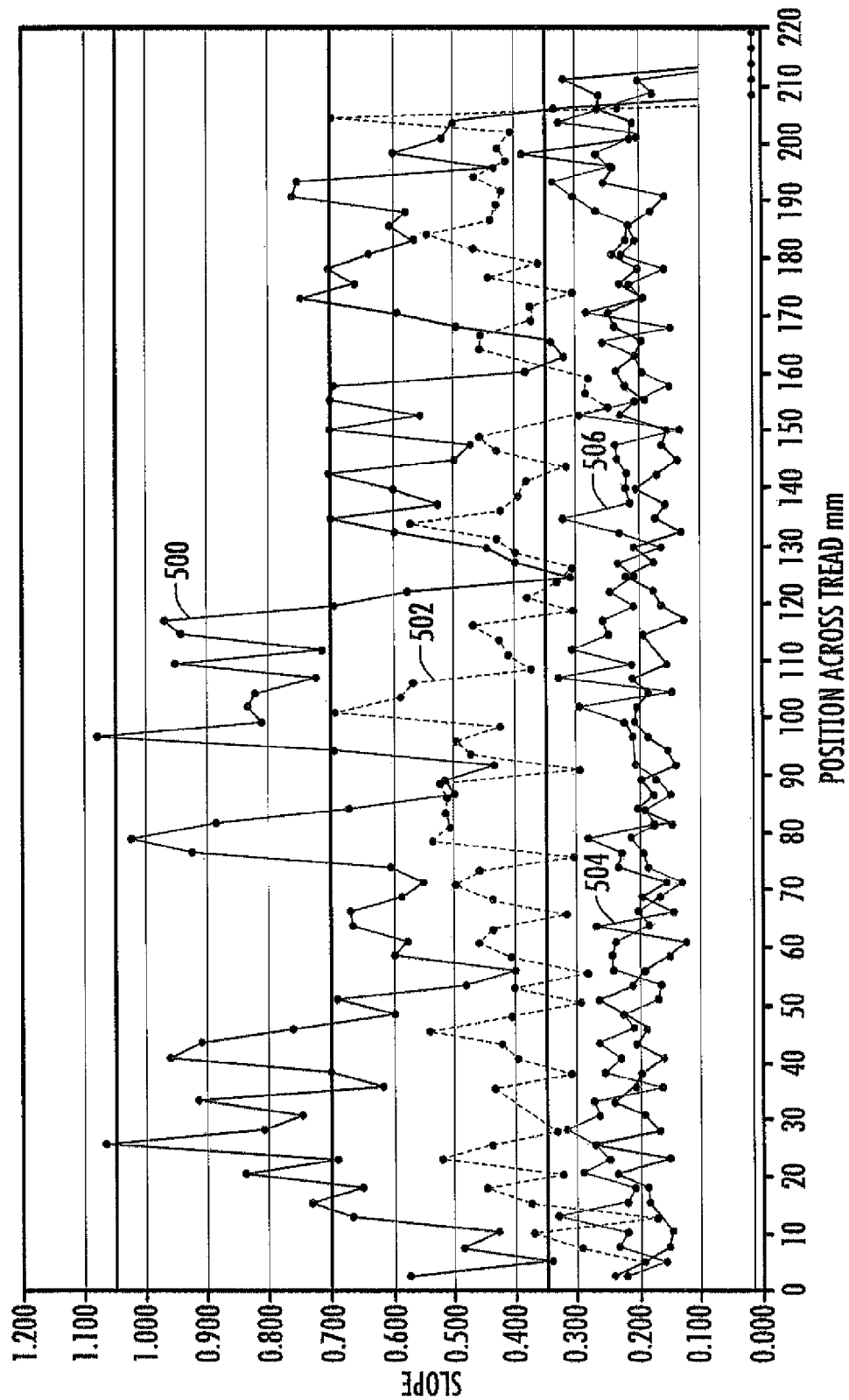
FIG. 5 is a graphical representation of exemplary measurement analysis output in accordance with aspects of the presently disclosed technology, with horizontal position in millimeters (mm) plotted along the abscissa and slope (defined as the rise over run) plotted along the ordinate for four exemplary surfaces.

Another example of the comparison and evaluation that may be done in step 210 (and or as part of the output provided in step 110 of FIG. 1) is shown in FIG. 5. FIG. 5 is a graphical representation of the slope (plotted as rise over run values) versus the horizontal tread position (plotted in mm) for four exemplary evaluated surfaces. The slope plot 500 representative of a first surface has slope rise/run values ranging from about 0.35 to about 1.05. Slope plot 502 representative of a second surface has slope rise/run values ranging from about 0.20 to about 0.70. Slope plots 504 and 506 representative of third and fourth surfaces have slope rise/run values ranging from about 0.10 to about 0.30.

Depending on the desired user output at step 110, these slope plots may be analyzed in different ways. For example, they may be used to determine average slope values for each measured surface for subsequent characterization into a ranking category. The data may be used to produce additional visually depicted information such as but not limited to a moving average or highlighted area(s) of concern for closer inspection or analysis. The data may also be used to signal when the slope level goes over and/or under a predetermined threshold level. For example, with reference to FIG. 5, the subject system and method could be configured to generate an alarm signal every time the slope values exceed a 1.050 rise/run level or fall below a 0.350 rise/run level. In one example, when user outputs are evaluating the wear of finishing brushes, establishing and monitoring a lower threshold value may be particularly useful for identifying when finishing brush bristles have become so worn as to be unable to create deep enough surface grooves to achieve desirable slope levels. As such, slope evaluation can be used to detect suitable brush replacement times. In addition, slope evaluation may also be able to determine and control the pitch between brush bristles to better effectuate desired surface slope.

Figure 6:
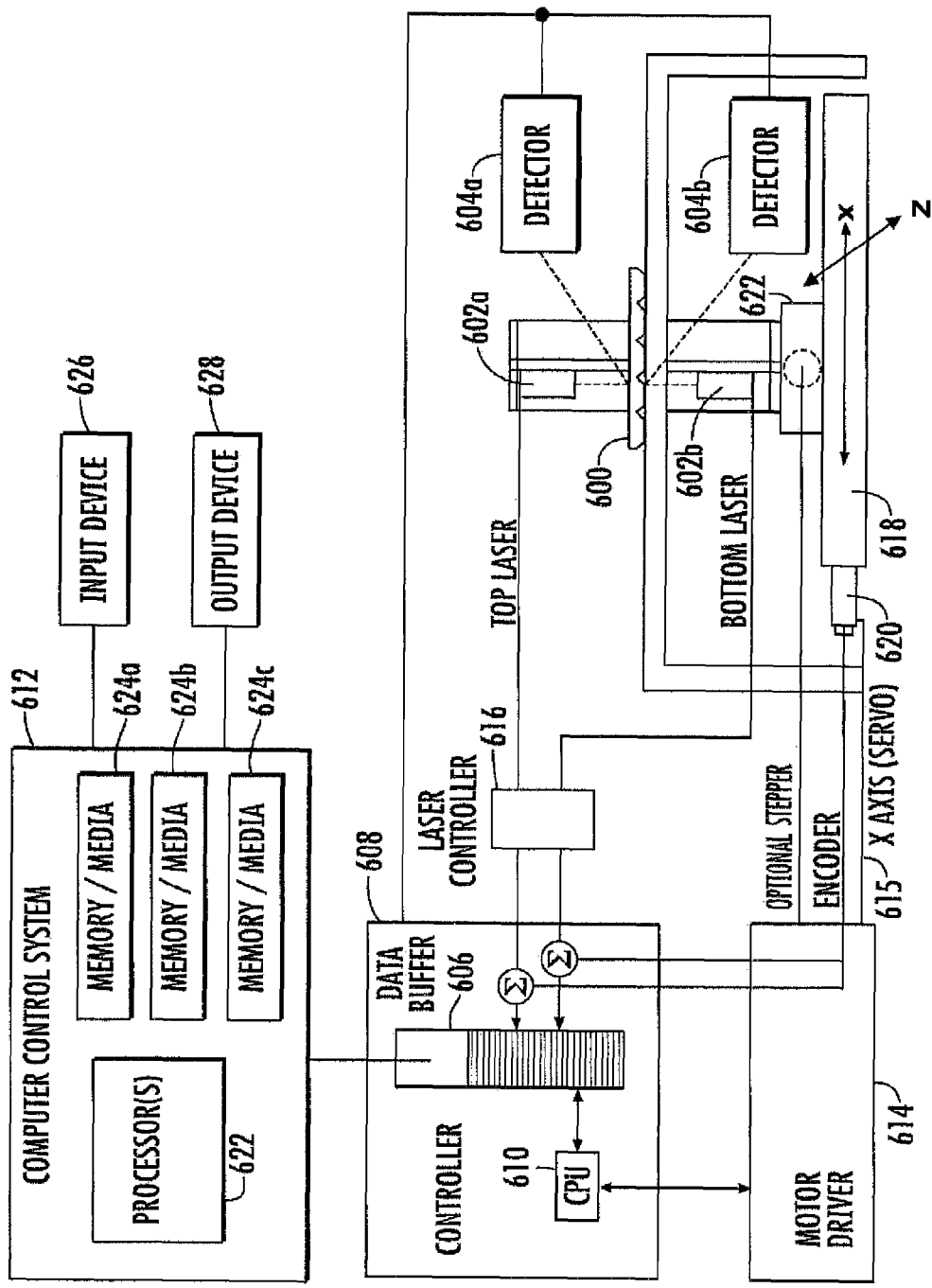
FIG. 6 is a block diagram of exemplary hardware components in a system for measuring and analyzing the profile of a tire surface in accordance with aspects of the presently disclosed technology.

Referring now to exemplary hardware features for accomplishing the subject surface measurement and evaluation techniques, FIG. 6 provides an exemplary block diagram of such components. This particular example discusses profile measuring equipment that employs a laser scanning device, although it should be appreciated that other particular technologies for sensing and measuring one or more dimensions of a surface (e.g., ultrasonic, x-ray or other technologies) may be used.

Referring now to FIG. 6, the element to be analyzed 600 may correspond to top and/or bottom surfaces of a pre-molded tread or other material. First and second lasers 602*a* and 602*b* scan and sense the respective top and bottom surfaces of the tread sample 600. The illuminating output beams from lasers 602*a* and 602*b* (which may be one or more fixed point or sheet-of-light lasers) are reflected from the surfaces of tread sample 600 into respective detector elements 604*a* and 604*b*. The lasers and/or detectors may include focusing lenses and/or other optical filtering elements. Detectors 604*a* and 604*b* are able to determine relative positioning of the scanned surfaces and provide such measurement data to a data buffer or other memory storage device. The system of FIG. 6 provides features for obtaining profile measurements on both top and bottom surfaces, although it should be appreciated that evaluation of only a single surface is within the scope of the presently disclosed technology. In one example, the detectors 604*a* and 604*b* determine one coordinate of the measurement data (e.g., the y coordinate in the vertical direction) while encoder 615 tracks and provides a second coordinate (e.g., the x coordinate in the horizontal direction). In other examples, multiple coordinates (e.g., defining measurement data in two or three dimensions) are directly determined by the detectors 604*a* and 604*b*.

Referring still to FIG. 6, measurement data from detectors 604*a* and 604*b* are provided to one or more data buffers 606 in a profilometer controller 608. Controller 608 may also include one or more processors 610 capable of analyzing or otherwise processing the data stored in buffer 606 or otherwise relaying such stored data to other locations such as to a peripheral computer control system 612. Processor 610 may also be coupled to a motor driver 614 and laser controller 616. Motor driver 614 may adjust in multiple directions the location of a mounting base 618 onto which the illuminating lasers and receptors are mounted relative to the tread sample 600. For example, motor driver controls may be provided to servo 620 to adjust positioning as needed in the x direction of the horizontal plane and/or to optional stepper 622 to adjust positioning as needed in the z direction of the horizontal plane. Laser controller 616 provides output signals for controlling the positioning, power levels, timing and other parameters associated with lasers 602a and 602b. Although FIG. 6 shows an arrangement in which the lasers are provided in a fixed location and the measured surfaces can be adjusted, the system can alternatively be configured to provide controlled movement of the lasers while keeping the measured surface at a fixed location.

Computer control system 612 may generally include such components as at least one memory/media element or database for storing data and software instructions as well as at least one processor. In the particular example of FIG. 6, a processor(s) 622 and associated memory/media elements 624a, 624b and 624c are configured to perform a variety of computer-implemented functions (i.e., software-based data services). At least one memory/media element (e.g., element 624b in FIG. 6) is dedicated to storing software and/or firmware in the form of computer-readable and executable instructions that will be implemented by the one or more processor(s) 622. Other memory/media elements (e.g., memory/media elements 624a, 624c) are used to store data which will also be accessible by the processor(s) 622 and which will be acted on per the software instructions stored in memory/media element 624b. The various memory/media elements of FIG. 6 may be provided as a single or multiple portions of one or more varieties of computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others. Although FIG. 6 shows three separate memory/media elements 624a, 624b and 624c, the content dedicated to such devices may actually be stored in one memory/media element or in multiple elements. Any such possible variations and other variations of data storage will be appreciated by one of ordinary skill in the art.

In one particular embodiment of the present subject matter, a first portion of memory/media 624a is configured to store input data for the subject surface analysis system and related methods. Input data stored in memory/media element 624a may include raw measurement data exported from the data buffer 606 as measured by the laser-based profilometer equipment. Data in memory 624a may also include input parameters provided from a user establishing limits for certain rankings of slope evaluation. Although such user-established limits and other input data may be pre-programmed into memory/media element 624a, they may also be entered as input data from a user accessing an input device 626, which may correspond to one or more peripheral devices configured to operate as a user interface with computer control system 612. Exemplary input devices may include but are not limited to a keyboard, touch-screen monitor, microphone, mouse and the like.

Second memory element 624b includes computer-executable software instructions that can be read and executed by processor(s) 622 to act on the data stored in memory/media element 624a to create new output data (e.g., surface rankings, alarm signals, graphical outputs and/or control signals for improving or modifying a brush finishing process) for storage in a third memory/media element 624c. Such output data may be provided to a peripheral output device 628, such as monitor, printer or other device, or as control signals to still further components. Computing/processing device(s) 622 may be adapted to operate as a special-purpose machine by executing the software instructions rendered in a computer-readable form stored in memory/media element 624b. When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for measuring and evaluating surface variations of a tire component, comprising:
   measuring data points relative to a given surface of the tire component, the tire componenet comprising a brushed finished surface or a buffed tire casing, wherein said data points comprise at least first and second coordinates;
   electronically calculating the slope at a plurality of different locations along the measured surface of the tire component by determining the degree of steepness between selected ones of the at least first and second coordinates measured along the given surface of the tire component;
   electronically comparing at least one slope-based parameter to one or more predetermined levels to determine a characterization defining one or more of surface adhesion fitness, finishing brush wear level and brush bristle placement location; and
   visually displaying the determined characterization as output.

2. The method of claim 1, wherein the electronically calculated slope comprises one of rise over run, angle and grade.

3. The method of claim 1, wherein said step of electronically comparing at least one slope-based parameter to one or more predetermined levels comprises determining whether an average slope value falls within an angular range selected from the range of twenty degrees to fifty-five degrees.

4. The method of claim 1, wherein said slope-based parameter comprises an average of selected slope values electronically calculated at each of the plurality of different locations.

5. The method of claim 1, wherein said step of electronically calculating the slope at a plurality of different locations comprises determining the degree of steepness between identified local maximum and minimum data points measured along the given surface of the tire component.

6. The method of claim 1, wherein said step of electronically calculating the slope at a plurality of different locations comprises determining the degree of steepness between each adjacent pair of the data points measured along the given surface of the tire component, and wherein the at least one slope-based parameter compared to one or more predetermined levels comprises the slope calculated at each of the plurality of different locations.

7. The method of claim 1,
   wherein said step of electronically calculating the slope comprises determining the degree of steepness between each adjacent pair of data points measured along the given surface of the tire component;
   wherein the method further comprises a step of obtaining an average value, the average value comprising an average of the set of all electronically calculated slope values after removing one or more highest electronically calculated slope values and one or more lowest electronically calculated slope values; and wherein the at least one slope-based parameter compared to one or more predetermined levels comprises the average value.

8. The method of claim 1, wherein said step of measuring data points comprises scanning the given surface of the tire component with a laser and detecting illumination reflected from the given surface of the tire component to determine first and second coordinates corresponding to vertical and horizontal position of the given surface.

9. The method of claim 1, further comprising a step before said step of electronically calculating the slope of adjusting upwards or downwards the measured value of selected of the at least first and second coordinates.

10. A measurement system for evaluating surface variations of a tire component, comprising:
- a measuring instrument for scanning the given surface of the tire component and measuring data points respectively comprising at least first and second coordinates corresponding to vertical and horizontal position of the given surface, the tire component comprising a brushed finished surface or a buffed tire casing;
- a first memory adapted for storing the data points determined by said measuring instrument;
- a second memory adapted for storing software in the form of computer-executable instructions; and
- at least one processor coupled to said first and second memories and configured to selectively implement the computer-executable instructions stored in the second memory to process the data points stored in the first memory;
- wherein said at least one processor implements the computer-executable instructions stored in said second memory in order to implement the functions of: calculating the slope at a plurality of different locations along the given surface of the tire component by determining the degree of steepness between selected ones of the first and second coordinates measured along the given surface of the tire component; and comparing at least one slope-based parameter to one or more predetermined levels to determine a characterization defining one or more of surface adhesion fitness, finishing brush wear level and brush bristle placement location.

11. The measurement system of claim 10, wherein said measuring instrument comprises:
- a laser for scanning the given surface of the tire component with one or more beams of illumination;
- a detector for optically capturing a reflection of the one or more beams of illumination.

12. The measurement system of claim 10, further comprising an output device for visually displaying the determined characterization defining one or more of surface adhesion fitness, finishing brush wear level and brush bristle placement location.

13. The measurement system of claim 10, further comprising an output device for signaling an alarm when the at least one slope-based parameter is above or below selected ones of the one or more predetermined levels.

14. The measurement system of claim 10, wherein said at least one processor is further configured to calculate slope at the plurality of different locations by determining one or more of rise over run, angle and grade.

15. The measurement system of claim 10, wherein said at least one processor is further configured to compare at least one slope-based parameter to one or more predetermined levels by determining whether an average slope value falls within an angular range selected from the range of twenty degrees to fifty-five degrees.

16. The measurement system of claim 10, wherein said slope-based parameter comprises an average of selected slope values calculated at each of the plurality of different locations.

17. The measurement system of claim 10, wherein said at least one processor is further configured to calculate the slope at a plurality of different locations by determining the degree of steepness between identified local maximum and minimum data points measured along the given surface of the tire component.

18. The measurement system of claim 10, wherein said at least one processor is further configured to calculate the slope at a plurality of different locations by determining the degree of steepness between each adjacent pair of the first and second coordinates measured along the given surface of the tire component, and wherein the at least one slope-based parameter compared to one or more predetermined levels comprises the slope calculated at each of the plurality of different locations.

19. The measurement system of claim 10, wherein said at least one processor is further configured to:
- adjust upwards or downwards the measured value of selected of the first and second coordinates;
- calculate the slope at a plurality of different locations by determining the degree of steepness between identified local maximum and minimum data points measured along the given surface of the tire component; and
- obtain an average value, the average value comprising an average of the set of all calculated slope values after removing one or more highest calculated slope values and one or more lowest calculated slope values; and
- wherein the at least one slope-based parameter compared to one or more predetermined levels comprises the average value.

* * * * *